United States Patent [19]

Ohta et al.

[11] Patent Number: 5,056,028

[45] Date of Patent: Oct. 8, 1991

[54] PRODUCTION MANAGEMENT SYSTEM WITH SIMULTANEOUS MULTIPLE DATA TRANSMISSION

[75] Inventors: Yoshimasa Ohta; Masayasu Arakawa; Masanao Yamamoto, all of Sayama, Japan

[73] Assignee: Honda Giken Kogyo Kabushiki Kaisha, Tokyo, Japan

[21] Appl. No.: 384,761

[22] Filed: Jul. 25, 1989

[51] Int. Cl.$^5$ ............................................. G06F 15/46
[52] U.S. Cl. .................................. 364/468; 235/375; 364/478
[58] Field of Search ................ 364/468, 478; 235/375, 235/385, 383; 104/88

[56] References Cited

U.S. PATENT DOCUMENTS

| | | | |
|---|---|---|---|
| 4,564,913 | 1/1986 | Yomogida et al. | 364/468 X |
| 4,630,216 | 12/1986 | Tyler et al. | 364/468 X |
| 4,821,198 | 4/1989 | Takeuchi et al. | 364/468 |
| 4,831,540 | 5/1989 | Hesser | 364/468 |

FOREIGN PATENT DOCUMENTS

| | | |
|---|---|---|
| 8204077 | 11/1982 | PCT Int'l Appl. . |
| 1437016 | 5/1976 | United Kingdom . |
| 1473167 | 5/1977 | United Kingdom . |
| 2037457 | 7/1980 | United Kingdom . |
| 2074347 | 10/1981 | United Kingdom . |
| 2181276 | 4/1987 | United Kingdom . |

OTHER PUBLICATIONS

Copy of European Search Report (10-6-89).

Primary Examiner—Joseph Ruggiero

[57] ABSTRACT

A production line for manufacturing automobiles, for example, has a plurality of movable carriages for carrying workpieces such as automotive bodies and a plurality of work stations for processing the automotive bodies such as by installing parts thereon or machining them. A controller which controls the work stations to process the automotive bodies has a memory having a plurality of storage areas for storing carriage identification data from the carriages that have arrived at the work stations and automotive body type data regarding the automotive bodies on the carriages, and also for storing carriage identification data transmitted from next carriages to arrive at the work stations and automotive body type data about the automotive bodies carried on the next carriages. When a carriage arrives at a work station, the carriage identification data about the carriage and the next carriage are transmitted from the carriage to the work station, and the controller transmits the automotive type data about the automotive bodies on the carriage and the next carriage to the work station. The automotive body in the work station can be processed based on the transmitted automotive body type data about the automotive body on the carriage and then the work station can be prepared based on the transmitted automotive body type data about the automotive body on the next carriage for the processing of the next automotive body which is to arrive next at the work station.

12 Claims, 2 Drawing Sheets

PRODUCTION MANAGEMENT SYSTEM WITH SIMULTANEOUS MULTIPLE DATA TRANSMISSION

BACKGROUND OF THE INVENTION

The present invention relates to a production management system for managing a production line including automatic machines such a robots for machining or installing parts on workpieces supported on carriages.

One recent production line system for manufacturing automobiles includes self-propelled carriages for delivering workpieces under the control of a controller and a plurality of work stations which are supplied with type data relative to the workpieces for enabling working robots at the work stations to install parts on the workpieces.

In such a production line system, it is necessary to supply correct processing instructions that match the type of the workpieces supported on the carriages that have arrived at the respective work stations. To meet such a requirement, Japanese Laid-Open Utility Model Publication No. 61-127921 discloses a system which supervises the movement of workpieces to work stations and displays on a display unit information about parts to be installed on a workpiece that has arrived at a work station which is attended by an operator and also information about parts to be installed on those workpieces which precede and follow the workpiece.

The above conventional system is however only aimed at improving the visibility of the information about parts to be installed by the operator at the work station, so that operation failures will be prevented.

Another known system disclosed in Japanese Laid-Open Patent Publication No. 61-249251 includes workpiece-supporting pallets which include thereon respective identification indicia. Information about processing details with respect to workpieces supported on the pallets can be accessed by reading the identification indicia of the pallets.

With this system, however, information about processing details with respect to a workpiece becomes available only when a pallet carrying that workpiece arrives at a work station. Therefore, a time required to prepare for the processing of the workpiece results in an operator standby time or a machine downtime or standby time and hence the production efficiency is lowered.

SUMMARY OF THE INVENTION

It is a major object of the present invention to provide a production management system which, after either parts are installed on a workpiece supported on a carriage that has arrived at a work station or such a workpiece is machined, allows preparations for the processing of a workpiece on a next carriage to be started in advance of arrival of the next carriage at the work station, so that any standby time of the operator or the automatic machine at the work station can be shortened and the production efficiency can be increased.

Another object of the present invention is to provide a production management system comprising a production line having a plurality of movable carriages for carrying workpieces and a plurality of work stations for processing the workpieces. The system includes a controller for controlling said work stations to process the workpieces wherein said carriages have first data communication units for transmitting carriage identification data inherent of said carriages to said controller, said controller comprising a memory for storing first data including the carriage identification data transmitted from said carriages and type data about the workpieces carried on the respective carriages, and second data including the carriage identification data transmitted from next carriages to arrive at the work stations and type data about the workpieces carried on said next carriages. The system further includes second data communication units for receiving the carriage identification data from said carriages, and third data communication units for transmitting at least the type data of said first and second data to said work stations. The system is arranged such that when one of said carriages arrives at one of said work stations, the carriage identification data about said one carriage are transmitted from said one carriage through said first and second data communication units to said controller wherein said controller transmits the type data of said first data and the type data of said second data from said memory through said third data communication unit to said one work station. The workpiece in said one work station can thereafter be processed based on said transmitted type data of the first data and then said one work station can be prepared based on said transmitted type data of the second data for the processing of a next workpiece to arrive at said one work station.

Still another object of the present invention is to provide a production management system wherein said memory comprises storage areas corresponding to said work stations, respectively, for storing said first and second data which have been transmitted successively thereto when said carriages move to said work stations.

Yet another object of the present invention is to provide a production management system wherein said work stations have controllers which includes programs for processing the workpieces based on said first and second data.

A still further object of the present invention is to provide a production management system comprising a production line having a plurality of movable carriages for carrying workpieces and a plurality of work stations for processing the workpieces. The system includes a controller for controlling said work stations to process the workpieces wherein said carriages have first data communication units for transmitting carriage identification data inherent of said carriages to said controller. The controller comprises a memory means for storing the carriage identification data transmitted from said carriages and type data about the workpieces carried on the respective carriages, second data communication unit for receiving the carriage identification data from said carriages, a comparator for comparing the carriage identification data transmitted from said carriages and the carriage identification data stored in said memory means, and third data communication unit for transmitting said type data to said work stations depending on the result of comparison effected by said comparator. The system is arranged such that when one of said carriages arrives at one of said work stations, the carriage identification data about said one carriage are transmitted from said one carriage through said first and second data communication unit to said controller. The carriage identification data transmitted from said one carriage and the carriage identification data stored in said memory means are compared by said comparator, and, if the compared carriage identification data agree with each other, then the type data corresponding to said carriage identification data are transmitted through said third data communication unit to said one work station, whereby the workpiece in said one work station can be processed based on said transmitted type data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

Figure 1:
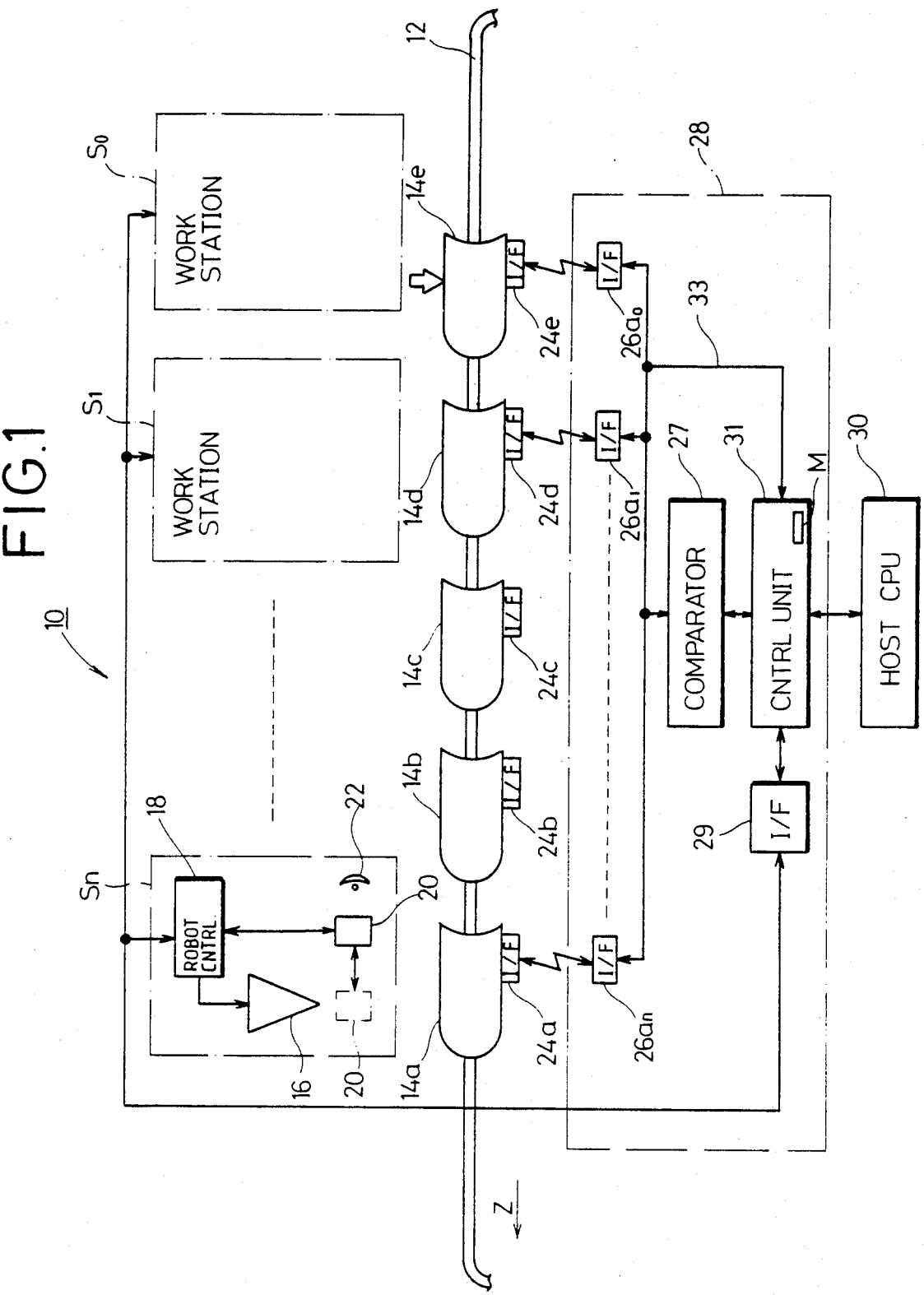
Figure 2:
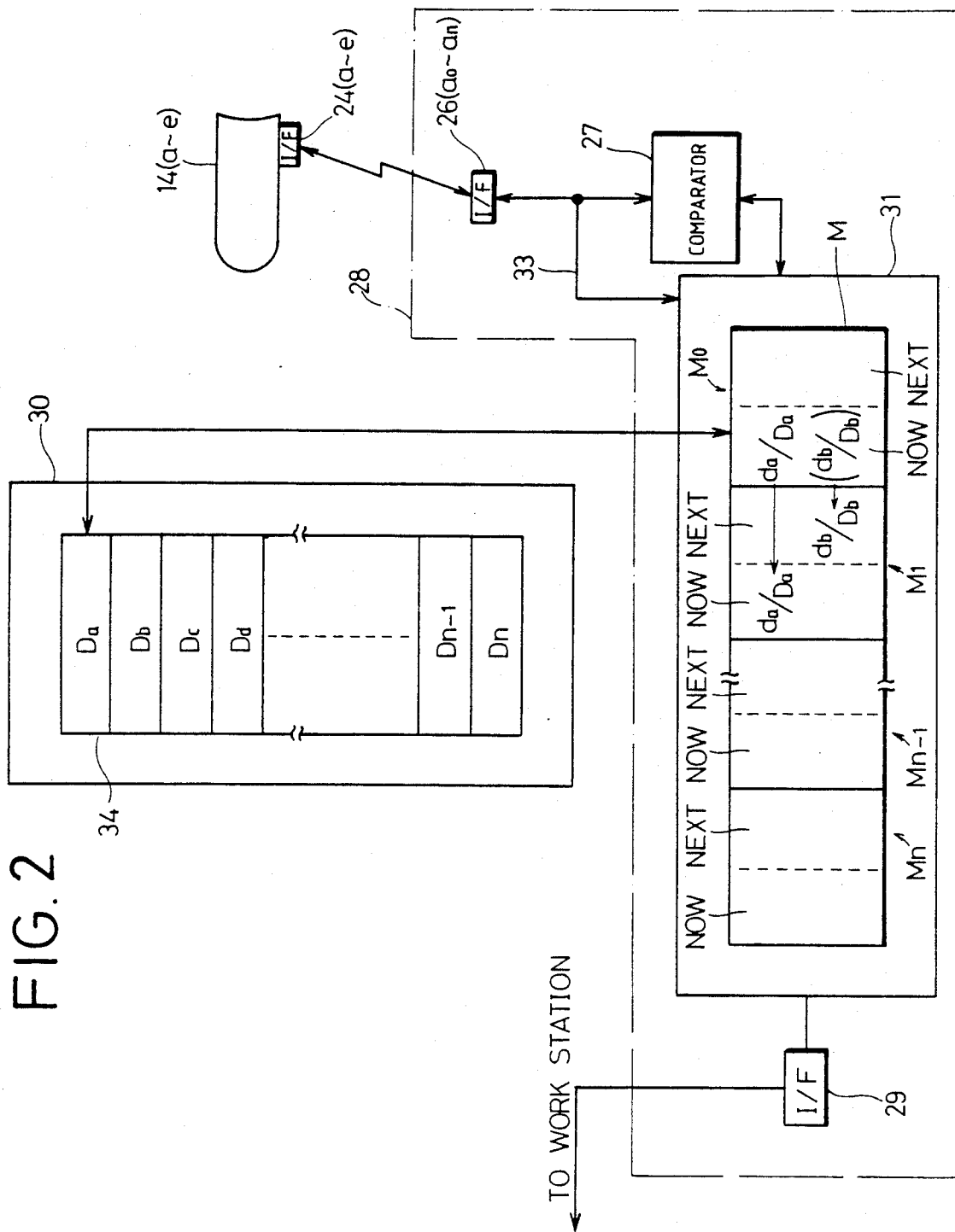

FIG. 1 is a schematic plan view, partly in block form, of a production line combined with a production management system according to the present invention; and FIG. 2 is a block diagram showing the structure of a memory for storing carriage identification data and type data, the memory being employed in a controller of the production management system.

DETAILED DESCRIPTION OF THE PREFERRED EMBODIMENT

FIG. 1 schematically shows a production line combined with a production management system in accordance with the present invention. The production line, generally denoted at 10, includes a straight or looped path or track 12 which supports thereon a plurality of carriages 14a through 14e such as self-propelled carriages. The carriages 14a through 14e travel on the path 12 in the direction indicated by the arrow Z.

Work stations $S_0$ through Sn including working robots are disposed at intervals along the path 12. In the work stations $S_0$ through Sn, parts are installed on workpieces (such as automotive bodies, for example) carried on the carriages 14a through 14e, respectively, or those workpieces are machined. For example, automotive bodies are successively placed on the carriages 14a through 14e in the work station $S_0$, and parts are installed on the automotive bodies or the automotive bodies are machined in the other work stations $S_1$ through Sn.

Each of the work stations $S_0$ through Sn comprises an automatic machine 16 such as a robot for effecting a certain operation, a robot controller 18 for controlling the automatic machine 16, and a workpiece mount base 20 for supporting the workpiece which has been delivered by one of the carriages 14a through 14e. An operator 22 attending the work station does various works, e.g., places a part or parts supplied from a parts feeder (not shown) on the workpiece mount base 20, and moves the workpiece mount base 20 toward the automatic machine 16.

The carriages 14a through 14e have their respective inherent carriage identification data. Carriage data communication interfaces 24a through 24e serving as first data communication means are attached to the carriages 14a through 14e, respectively. Controller data communication interfaces $26a_0$ through $26a_n$ serving as second data communication units correspond respectively to the work stations $S_0$ through Sn and are included in a controller 28. The carriage identification data are transmitted from the carriage data communication interfaces 24a through 24e through the controller data communication interfaces $26a_0$ through $26a_n$ and a comparator 27 to a controller unit 31 in the controller 28.

The controller 31 is electrically connected to the robot controllers 18 in the respective work stations $S_0$ through Sn through an interface 29 serving as third data communication unit. The controller unit 31 distributes, to the work stations $S_0$ through Sn, type data corresponding to the automotive bodies carried on the carriages 14a through 14e, depending on the carriage identification data of the carriages 14a through 14e which have arrived at the respective work stations $S_0$ through Sn, so that the controller 31 instructs the work stations with respect to the details of work to be performed on the automotive bodies.

The controller unit 31 is electrically coupled to a host CPU 30 which supervises the production line 10. Upon a request from the controller unit 31, the host CPU 30 supplies type data about the automotive bodies carried on the carriages 14a through 14e from a type data table 34 (see FIG. 2). The controller unit 31 controls the carriages 14a through 14e over a communication line 33, e.g., starts and stops the carriages 14a through 14e, and also stores in a memory M the automotive body type data received from the host CPU 30 and the carriage identification data received from the carriages 14a through 14e.

FIG. 2 shows the structure of the memory M in the controller unit 31 in relation to the production line 10. The memory M has storage areas $M_0$ through Mn corresponding respectively to the work stations $S_0$ through Sn. The storage areas $M_0$ through Mn comprise areas (NOW areas) for storing the carriage identification data about the carriages 14a through 14e that have arrived at the respective work stations $S_0$ through Sn and the automotive body type data about the automotive bodies carried on these carriages 14a through 14e, and areas (NEXT areas) for storing the carriage identification data about the carriages 14a through 14e carrying the automotive bodies that are to arrive from the previous work stations $S_0$ through Sn and the automotive body type data about the automotive bodies carried on these carriages 14a through 14e.

As the carriages 14a through 14e are successively moved in the direction indicated by the arrow Z, the data stored in the storage areas $M_0$ through Mn are successively shifted into those storage areas $M_0$ through Mn corresponding to the work stations $S_0$ through Sn at which the carriages 14a through 14e have arrived. The data stored in the storage areas $M_0$ through Mn are simultaneously distributed through the interface 29 to the work stations $S_0$ through Sn. Thus, the work stations $S_0$ through Sn receive, from the controller 28, the automotive body type data about the automotive bodies carried on the carriages 14a through 14e that have reached the work stations $S_0$ through Sn and the automotive body type data about the automotive bodies carried on the carriages 14a through 14e that are to reach those work stations $S_0$ through Sn.

The type data table 34 in the host CPU 30 stores the automotive body type data. The automotive body type data include instruction data about details of work to be done on the automotive bodies in the work stations $S_0$ through $S_n$ on the production line 10, and data about parts to be installed on the automotive bodies. The host CPU transmits desired automotive body type data to the controller 28 upon a request from the controller 28.

The production line 10 associated with the production management system according to the present invention is basically constructed as described above. Now, operation and advantages of the production line 10 and the production management system will be described below.

When the carriage 14a, for example, has arrived at the work station $S_0$, the controller 28 receives carriage identification data da relating to the carriage 14a through the interfaces 24a, 26a° The carriage identification data da are delivered over the communication line 33 and stored in the NOW area in the storage area $M_0$ in the memory M.

Then, when an automotive body as a workpiece is placed on the carriage 14a in the work station $S_0$, the controller unit 31 requests the host CPU 30 for type data about the automotive body. The host CPU 30 transmits automotive body type data Da corresponding to the automotive body carried on the carriage 14a from the type data table 34 to the controller unit 31. The controller unit 31 stores the received automotive body type data Da in the NOW area in the storage area $M_0$. Therefore, the NOW area in the storage area $M_0$ which corresponds to the work station $S_0$ stores the carriage identification data da about the carriage 14a that has arrived at the work station $S_0$ and the automotive body type data Da about the automotive body carried on the carriage 14a.

Then, the controller 28 starts to move the carriage 14a toward the next work station $S_1$, and at the same time shifts the carriage identification data da and the automotive body type data Da from the NOW area in the storage area $M_0$ to the NOW area in the storage area $M'$ which corresponds to the work station $S_1$.

When the next carriage 14b arrives at the work station $S_0$ and a next automotive body is placed on the carriage 14b, the controller 28 stores carriage identification data db about the carriage 14b and automotive body type data Db about the next automotive body into the NOW area in the storage area $M_0$, and also stores these carriage identification data db and automotive body type data Db into the NEXT area in the storage area $M_1$ (see FIG. 2).

In this manner, the NOW areas in the storage areas $M_0$ through $M_n$ which correspond respectively to the work stations $S_0$ through $S_n$ store the carriage identification data da through de about the carriages 14a through 14e which have arrived at the work stations $S_0$ through $S_n$, respectively, and the automotive body type data Da through De about the automotive bodies placed respectively on the carriages 14a through 14e. The NEXT areas in the storage areas $M_0$ through $M_n$ also store the carriage identification data da through de about the carriages 14a through 14e which are to arrive next at the work stations $S_0$ through $S_n$, and the automotive body type data Da through De about the automotive bodies carried on these carriages 14a through 14e. These data da through de and Da through De are successively shifted into the next storage areas $M_1$ through $M_n$ as the carriage 14a through 14e are moved into the next work stations $S_1$ through $S_n$.

When the carriage identification data da through de are received from the carriages 14a through 14e by the comparator 27, the comparator 27 in the controller 28 compares the received carriage identification data da through de with the carriage identification data da through de which have been stored in the NOW areas. For example, when the carriage 14a carrying an automotive body has arrived at the work station $S_n$, the carriage 14a transmits its carriage identification data da to the comparator 27 through the interfaces 24a, 26an. The comparator 27 compares the carriage identification data da with the carriage identification data stored in the NOW area in the storage area $M_n$ which corresponds to the work station $S_n$. If the compared carriage identification data are the same, then the automotive body type data stored in the NOW area in the storage area $M_n$ and the next automotive body type data stored in the NEXT area in the storage area $M_n$ are sent to the robot controller 18 in the work station $S_n$ through the interface 29. If the compared carriage identification data are different from each other, then a data error is displayed, for example, and the operation of the system is interrupted.

In the work station $S_n$, a part or parts are supplied from the parts feeder based on the automotive body type data from the NOW area, and the operator transfers the automotive body from the carriage 14a onto the workpiece mount base 20. When the operator 22 presses the start button (not shown) of the automatic machine 16 such as a robot, the workpiece mount base 20 is moved toward the automatic machine 16 to supply the automotive body to the automatic machine 16. Under the control of the robot controller 18, the automatic machine 16 machines, or installs the part or parts on, the automotive body based on a program selected by the automotive body type data.

After the automotive body has been machined or the part or parts have been installed on the automotive body, the workpiece mount base 20 returns to its original position. Then, the operator 22 prepares a part or parts to be installed on the next automotive body to be delivered to the work station $S_n$. Since the automotive body type data on the next automotive body to be delivered to the work station $S_n$ have already been supplied from the NEXT area in the storage area $M_n$, the operator can prepare for the operation to be carried on the next automotive body before the next automotive body actually arrives at the work station $S_n$. The robot controller 18 can also select a program for the next operation based on the automotive body type data from the NEXT area, and make the automatic machine 16 ready, so that it is possible to process the next automotive body as soon as it reaches the next work station $S_n$.

In cases where the carriages 14a through 14e are self-propelled carriages, they can freely move along the path 12. Even if self-propelled carriages are scattered along the path 12 and positioned in the work stations $S_1$, $S_3$, and $S_5$, the work station $S_5$, for example, can obtain in advance automotive body type data about the automotive body placed on the carriage in the work station S, preceding the work station $S_5$. Therefore, the operator 22 and the robot controller 18 in the work station $S_5$ can make preparations for the operation to be carried out on the automotive body placed on the carriage that is to arrive next at the work station $S_5$.

With the present invention, as described above, when data necessary for processing workpieces carried on carriages and having arrived at work stations of a production line are transmitted to these work stations, the data about the workpiece that has arrived at a work station and the data about the workpiece that is to arrive next at the work station are simultaneously transmitted to the work station.

In that work station, therefore, preparations for the operation to be effected on the next workpiece can be made after the present workpiece has been processed and before the next workpiece arrives at the work station. Accordingly, the efficiency of the production line can be increased.

When carriage identification data about a carriage which has arrived at a work station are received, the received carriage identification data are compared with the carriage identification data which have already been received from the carriage when it was positioned in the preceding work station. If the compared carriage identification data agree with each other, then the type data about the workpiece are transmitted to the work station. Therefore, the workpiece can accurately be processed in the work station.

Although a certain preferred embodiment has been shown and described, it should be understood that many changes and modifications may be made therein without departing from the scope of the appended claims.

What is claimed is:

1. A production management system comprising:
   production line means having a plurality of movable carriages for carrying workpieces and a plurality of work stations for processing the workpieces; and
   control means for controlling said work stations to process the workpieces, said carriages having first data communication means for transmitting carriage identification data descriptive of said carriages to said control means, said control means comprising
      memory means for storing first data including said carriage identification data transmitted from at least one of said carriages positioned at one of said work stations and workpiece type data descriptive of the workpieces carried on said one carriage, said workpiece type data including instruction data of details of work to be performed on the workpieces at said one work station and data about parts to be installed on the workpieces at said one work station and for storing second data including said carriage identification data transmitted from a subsequent carriage, following said one carriage along said production line means, to arrive at said one work station and workpiece type data descriptive of the workpieces carried on said subsequent carriage,
      second data communication means for receiving said carriage identification data from said carriages, and
      third data communication means for transmitting at least said workpiece type data of said first and second data to said work stations,
   the production management system operable such that when said one carriage arrives at said one work station, said carriage identification data from said one carriage are transmitted from said one carriage through said first and second data communication means to said control means and said control means transmits said workpiece type data of said first data and said workpiece type data of said second data from said memory means through said third data communication means to said one work station, workpieces in said one work station are processed based on said transmitted workpiece type data of said first data and said one work station is prepared based on said transmitted workpiece type data of said second data for processing of said subsequent workpiece to arrive at said one work station.

2. The production management system according to claim 1, said memory means comprising storage areas corresponding to said work stations, respectively, for storing said first and second data which have been transmitted successively thereto when said carriages move to said work stations.

3. The production management system according to claim 1, said work stations including controllers having programs for processing the workpieces based on said first and second data.

4. A production management system comprising:
   production line means having a plurality of movable carriages for carrying workpieces and a plurality of work stations for processing the workpieces; and
   control means for controlling said work stations to process the workpieces, said carriages having first data communication means for transmitting carriage identification data descriptive of said carriages to said control means, said control means comprising
      memory means for storing said carriage identification data transmitted from said carriages and workpiece type data descriptive of the workpieces carried on respective carriages, said workpiece type data including instruction data of details of work to be performed on the workpieces at said work stations and data about parts to be installed on said workpieces at said work stations,
      second data communication means for receiving said carriage identification data from said carriage,
      comparator means for comparing said carriage identification data transmitted from said carriages and said carriage identification data stored in said memory means, and
      third data communication means for transmitting said workpiece type data to said work stations depending on the result of comparison effected by said comparator means,
   the production management system operable such that when one of said carriages arrives at one of said work stations, said carriage identification data from said one carriage are transmitted from said one carriage through said first and second data communication means to said control means, said carriage identification data transmitted from said one carriage and said carriage identification data stored in said memory means are compared by said comparator means, and, if the compared carriage identification data agree said workpiece type data corresponding to said carriage identification data are transmitted through said third data communication means to said one work station, the workpiece in said one work station is processed based on said transmitted workpiece type data.

5. A production management system comprising:
   production line means including a plurality of movable carriages for transporting workpieces along said production line means to plural work stations to be machined;

control means, operatively coupled between said control means and said movable carriages, for transmitting identification data of each respective movable carriage therefrom to said control means for storage therein in memory means; and second communication means, operatively coupled between said control means and said work stations, for respectively transmitting to each of said work stations said stored identification data and workpiece type data descriptive of said workpieces and processing steps to be performed on workpieces of a particular movable carriage located at a particular work station and for a subsequent movable carriage to arrive following said particular movable carriage along said production line means under direction of said control means.

6. The production management system of claim 5, said memory means comprising storage areas designated respectively for each of said work stations for storing said transmitted identification data and said workpiece type data corresponding to a particular movable carriage located at each of said work station and for updating said storage areas as said movable carriages progress along said production line means under control of said control means.

7. The production management system of claim 6, said control means further comprising comparator means for respectively comparing said stored identification data and said transmitted identification data of said movable carriages located at each of said work stations and for generating a transmit signal indicative of correspondence to enable said second communication means.

8. The production management system of claim 7, said workpiece type data further comprising information regarding parts to be installed on said workpieces.

9. A method of controlling a production system including production line means having a plurality of movable carriages for transporting workpieces along the production line means to plural work stations to be machined comprising the steps of:

transmitting identification data of each respective movable carriage therefrom through first communication means to a control means;

storing in a memory means of the control means the transmitted identification data; and transmitting from the control means to each respective work station, through second communication means, the stored identification data and workpiece type data descriptive of the workpieces and processing steps to be performed on workpieces of a particular movable carriage located at a particular work stations and for a subsequent movable carriage to arrive following the particular movable carriage along the production line means under direction of the control means.

10. The method of controlling a production system of claim 9, said step of storing comprising respectively storing in designated storage areas of the memory means the transmitted identification data and the workpiece type data corresponding to a particular movable carriage located at each of the workstations and updating the storage areas as the movable carriages progress along the production line means under control of the control means.

11. The method of controlling a production system of claim 10, further comprising the step of respectively comparing in a comparison means the stored identification data and the transmitted identification data of the movable carriages located at each of the work stations to generate a transmit signal indicative of correspondence to enable the second communication means.

12. The method of controlling a production system of claim 11, said step of transmitting through the second communication means further comprising transmitting information regarding parts to be installed on the workpieces.

* * * * *